US011221187B2

(12) United States Patent
Kearney

(10) Patent No.: US 11,221,187 B2
(45) Date of Patent: Jan. 11, 2022

(54) PROCESS FOR APPLYING GRAPHENE LAYER TO METALLIC FIREARM ELEMENTS

(71) Applicant: Jesse E Kearney, Wellington, FL (US)

(72) Inventor: Jesse E Kearney, Wellington, FL (US)

( * ) Notice: Subject to any disclaimer, the term of this patent is extended or adjusted under 35 U.S.C. 154(b) by 280 days.

(21) Appl. No.: 16/275,579

(22) Filed: Feb. 14, 2019

(65) Prior Publication Data
US 2019/0249941 A1 Aug. 15, 2019

Related U.S. Application Data

(60) Provisional application No. 62/630,583, filed on Feb. 14, 2018.

(51) Int. Cl.
| B23Q 11/10 | (2006.01) |
| B23B 35/00 | (2006.01) |
| C09D 7/65 | (2018.01) |
| B05D 5/08 | (2006.01) |
| C23C 18/12 | (2006.01) |
| B05D 7/14 | (2006.01) |
| B05D 7/24 | (2006.01) |
| B21C 37/15 | (2006.01) |
| F41A 21/22 | (2006.01) |
| B23C 1/20 | (2006.01) |

(Continued)

(52) U.S. Cl.
CPC ............ F41A 21/22 (2013.01); B05D 5/08 (2013.01); B05D 7/14 (2013.01); B05D 7/24 (2013.01); B21C 37/152 (2013.01); B23B 35/00 (2013.01); B23C 1/20 (2013.01); B23P 15/00 (2013.01); B23Q 11/1061 (2013.01); C09D 7/65 (2018.01); C23C 8/40 (2013.01); C23C 18/12 (2013.01); C23C 18/1241 (2013.01); F41A 21/20 (2013.01); B05D 2202/00 (2013.01); B05D 2601/20 (2013.01)

(58) Field of Classification Search
None
See application file for complete search history.

(56) References Cited

PUBLICATIONS

Graphene Coatings. https://web.archive.org/web/20180208202400/http://iacoatings.com/graphene/ (accessed Jul. 15, 2021). (Year: 2018).*

(Continued)

Primary Examiner — William P Fletcher, III
(74) Attorney, Agent, or Firm — Melvin K. Silverman

(57) ABSTRACT

A process of eliminating friction and increasing structural hardness and durability and increasing longevity in the fabrication of metallic structures including at least one mechanical machining device with at least one cutting device, at least one element of material stock, and a reactionary lubricant, the process having the steps of placing the material stock on the working surface of a mechanical machining device, initiating the machining device wherein a cutting device will spin and be used to shape a firearm component, adding the reactionary lubricant to both the spinning drill bit engaged in shaping the firearm component and the firearm component's surface, and by an in situ chemical formation process the firearm component will obtain a layer of graphene formed through the friction, heat, and pressure bearing on spinning drill bit and firearm component surface, reducing the asperities in the material of the firearm component as the component is machined.

18 Claims, 4 Drawing Sheets

(51) Int. Cl.
*F41A 21/20* (2006.01)
*B23P 15/00* (2006.01)
*C23C 8/40* (2006.01)

(56) References Cited

PUBLICATIONS

Kumar, P.; Wani, M. F. Synthesis and Tribological Properties of Graphene: A Review. Jurnal Tribologi 2017, 13 (2017), 36-71. (Year: 2017).*

* cited by examiner

PROCESS FOR APPLYING GRAPHENE LAYER TO METALLIC FIREARM ELEMENTS

FIELD OF THE INVENTION

The present invention relates to then enhancement of overall performance and quality of firearms, firearm parts, and firearm accessories.

BACKGROUND OF THE INVENTION

Today's firearms are limited by the tensile strength of their original manufactured components, i.e., aluminum, steel, and in some cases polymer. The present invention seeks to use a process of micronized and/or nano-technology graphene to impart the benefits of graphene's attributes and enhance the overall structure and function of any given firearm, as graphene is structurally 200 times stronger than steel and is lighter than paper.

Graphene is a form of carbon consisting of a single layer of carbon atoms; it's also the basic structural element of graphite, diamond, charcoal, and carbon nanotubes. Some of the attributes desirable for the present application of graphene are its ability to conduct and maintain heat and electricity efficiently, while having exceptional material strength. This is desirable in an art area such as firearms, where efficient heat transfer is crucial to efficient and effective use of the firearm. For example, a standard 5.56×45 NATO cartridge projectile exiting a 16" carbine barrel travels approximately 3150 feet per second at a maximum effective distance of 400 meters. Theoretically, the velocity associated with the projectile is a result of the powder burning creating pressure behind the projectile contacting the barrel's rifling i.e., lands and grooves inside the barrel, as the bullet is slightly larger than the interior of the barrel. Due to the slightly larger size of the bullet traveling into the slightly smaller diameter barrel, it can be assumed that the velocity is also hindered by the friction caused between the bullet and the lands and groves. The present invention applied in the interior of the barrel will reduce and, in some cases, remove the friction thus resulting in extraordinary velocities, though the bullet components are the same. This higher velocity results in a flatter trajectory and greater distance of travel, this translates into lower cost for components even though performance is enhanced, thereby resulting in saving for consumers, i.e., the federal government, law enforcement agencies at the federal, state and local levels. The civilian consumer could also benefit.

Applying graphene in such a manner as to not hinder the performance, function, or integrity of firearms, their parts and their accessories, presents a challenging issue. The present invention seeks to resolves this. The present invention seeks to implement a tiered system and method of Resurfacing, Polishing, Enhancement of Firearms, Firearm Parts, and Firearm Accessories by use of graphene and its various forms during the manufacturing, production process, or by processing of an existing item post production. The present invention can be applied elsewhere to enhances the firearm in other ways. The reduction of friction applied to other areas of the firearm or it parts, both internally and externally reduces wear thus increasing the service life of the item, resulting in reduction of cost for replacement parts through wear and tear. In the case of application to a firearm's slide or in bolt, the present invention seeks to increase the rate of fire and the action's reset time due to the accelerated speed. The present invention, in most cases, will increase the rate of fire by at least 10%, this greatly enhances a soldier's ability to return fire thus enabling him to potentially save his or another's life.

The present invention's ability to conduct heat, allows the firearm and its components to expel heat and thus reducing the cooling time of firearm increasing its reliability and increasing its performance. There are additional benefits to the present invention, by applying the process to the exterior of the firearm will enhance the tensile strength of such specific firearm component, thus reducing potential breakage. As the application also strengthens the base material as to allow greater than normal tensile strength, there is significant potential that the pressures of the cartridges used can be increased beyond the normal Sporting Arms and Ammunition Manufacturer's Institute (SAAMI) levels, this is also in conjunction with the process being used in the firearm's chamber and bore. The present invention can be used in various ways to enhance firearms, firearm parts, components and firearm accessories to incredible levels than previously conceived.

SUMMARY OF THE INVENTION

The present invention relates to the process of eliminating friction and increasing structural hardness and durability and increasing longevity in the fabrication of metallic structures including at least one mechanical machining device with at least one cutting device, at least one element of material stock, and a reactionary lubricant. The process outlines the steps of placing the material stock on the working surface of a mechanical machining device, initiating the machining device wherein a cutting device, like a drill bit, will spin and be used to shape a firearm component, adding the reactionary lubricant to both the spinning cutting device engaged in shaping the firearm component and the firearm component's surface, and by an in situ chemical formation process the firearm component will obtain a layer of graphene formed through the friction, heat, and pressure bearing on spinning cutting device and firearm component surface, reducing the asperities in the material from the stock of the finished product.

A further embodiment applies at least one layer of graphene after the firearm component has already been fabricated, after the weapon has been coated or dipped in paint or protective coating, to further strengthen the firearm and protect the paint or protective coating.

A further embodiment applies at least one layer of graphene to the outer surface of the barrel of the firearm, additionally having a layer of graphene within the surface of the inner bore of the barrel of the firearm formed in situ from the process of placing the material stock on the working surface of a mechanical machining device, initiating the machining device wherein a cutting device, like a drill bit, will spin and be used to shape a firearm component, adding the reactionary lubricant to both the spinning cutting device engaged in shaping the firearm component and the firearm component's surface, and by an in situ chemical formation process the firearm component will obtain a layer of graphene formed through the friction, heat, and pressure bearing on spinning cutting device and firearm component surface, reducing the asperities in the material from the stock of the finished product. A form of graphene is applied either to the paint or coating used on the outer surface of the barrel.

The possible mechanical machining devices utilized in the present invention are chosen from the group of a hand drill, a computer numerical control milling machine, manual milling machine, and a lathe machine.

The aforementioned objects, features, and advantages of the invention will, in part, be pointed out with particularity, from the following drawings, Detailed Description of the Invention, and Claims herewith.

DETAILED DESCRIPTION OF CERTAIN EMBODIMENTS

Figure 1:
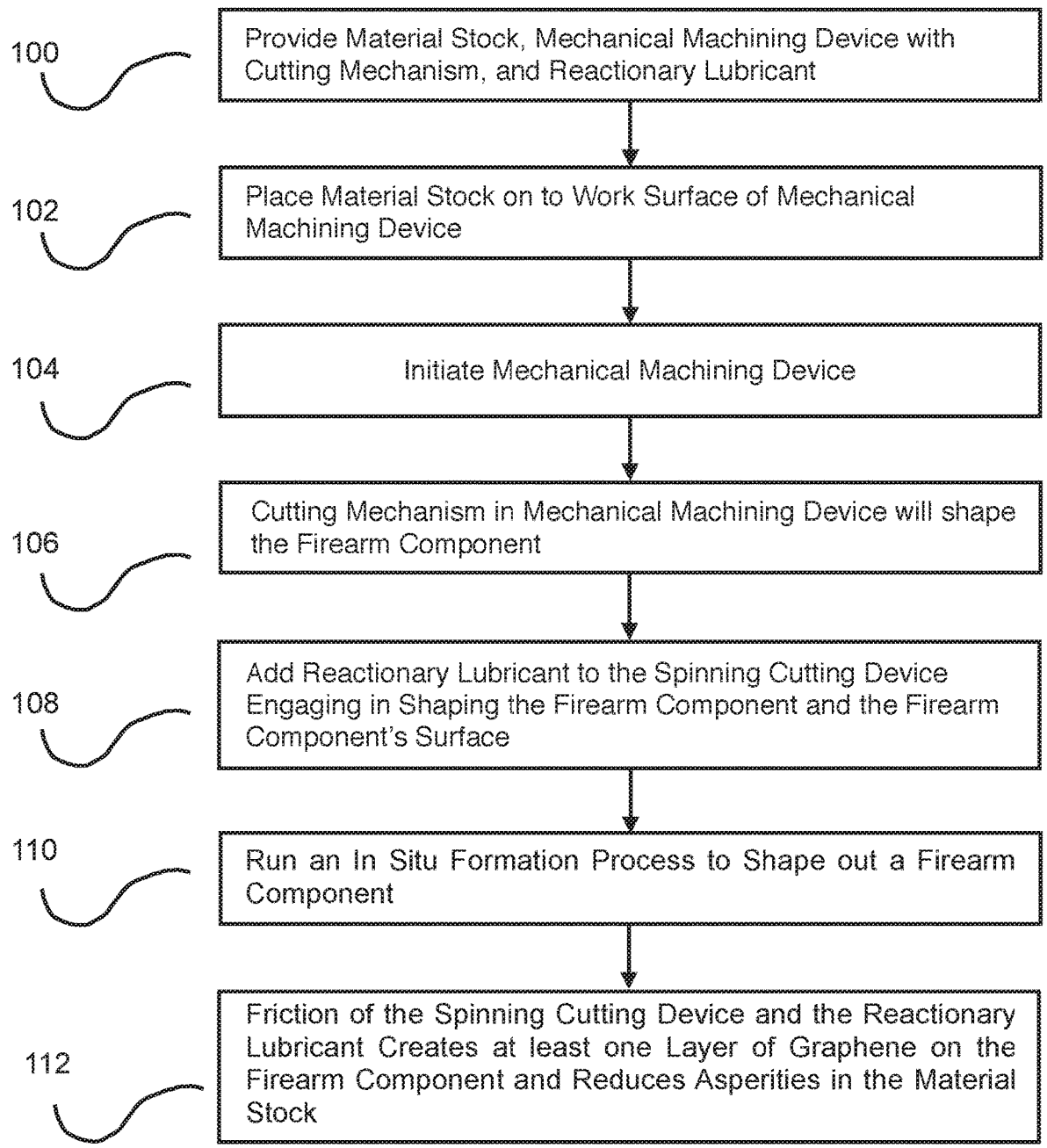
FIG. 1: A flowchart demonstrating the preferred embodiment of the present invention.

For a more complete understanding of the present invention and advantages thereof, reference is now made to the following description of various illustrative and non-limiting embodiments thereof, taking in conjunction with the accompanying drawings in which like reference numbers indicate like features.

In the preferred embodiment, it is desirable that for the construction of a firearm, in employing the present steps of achieving the present invention, that the firearm component selected for construction is to be fabricated from material stock that is of metallic type: steel, carbon steel, etc. Once the material is selected, the fabrication process begins by putting the component in a mechanical machining device such as a computer numerical control (CNC) milling machine. The material is fastened and the design of the firearm component is to be cut by a cutting device such as a drill bit. When a drill bit, preferably one that is metallic, makes contact with the metallic material stock surface there is significant friction, heat, and pressure that act upon the surfaces of both the drill bit and the material stock surface. To alleviate the heat and friction, a cooling lubricant, known as "cutting fluid", is typically applied when machining. This allows for the material stock and machining tools to not be at risk of altered properties that negatively affect the overall structural integrity of the materials, mainly issues of softening from the heat.

The cutting fluid that is added in the present invention is one where the lubricant used is configured in a way to serve as a sacrificial carbon source in the in situ formation of graphene on the surface of both the drill bit and the surface that comes in contact with the drill bit of the material stock. As claimed, this cutting fluid is deemed a "reactionary lubricant", meaning that while the fluid is being used to lubricate and cool the surface, the heat and friction are causing a reaction on the reactionary lubricant and metallic surfaces of the material stock and drill bit, this reaction is what specifically causes the in situ formation and deposit of graphene on the firearm component. This processes essentially cuts the firearm component while coating the component in a layer of graphene all at the same time.

The result of such process is an increase in overall tensile strength and material integrity of both the drill bit and the firearm component in fabrication. A prime example of the benefits of such a process can be observed by example of the fabrication of the barrel of a firearm. The barrel of firearm configured for a standard 5.56×45 NATO cartridge, with such projectile exiting a 16" carbine barrel traveling at approximately 3150 feet per second at a maximum effective distance of 400 meters, endures a large amount of stress as each round gets fired. The velocity associated with the projectile is a result of the powder burning creating pressure behind the projectile contacting the barrel's rifling i.e., lands and grooves inside the barrel, as the bullet is slightly larger than the interior of the barrel. The slightly larger size of the bullet traveling into the slightly smaller diameter barrel creates friction between the bullet and the lands and groves of the interior of the barrel, the metal on metal contact between the projectile and the barrel also adds to the friction and over stress put on the barrel. This leads to a both an effect on speed on the projectile and an effect on the longevity of the barrel due to the stresses degrading material integrity overtime. A further issue with a standard barrel is the inevitability of material having asperities which can already be existing and can develop and grow over time with wear and tear. By fabricating the barrel in the manner consistent with the instant invention, the asperities in the material stock are diminished by the graphene layer deposited on the material stock surface. The removal of these asperities results in heavily reducing the friction between the bullet and the interior surface of the barrel, thus resulting in extraordinary velocities, though the bullet components are the same, and resulting in a longer barrel life as the barrel now can handle higher stresses.

Once the in situ graphene formation and deposit steps are complete, typically in a preferred embodiment the firearm component will be anodized or painted to seal the metal from contaminants and protect from erosion and material degradation, such is standard with the construction of most firearm components. To further enhance and further protect the firearm component, either a layer of liquid graphene will be added to the paint for application or a graphene sheet can be applied to the surface of the firearm component after it is painted to seal the paint and given an extra layer of enhanced tensile strength and enhanced hardness to the material.

Shown in FIG. 1 is a flow diagram of the preferred embodiment of the system. The system involves providing material stock, a mechanical machining device with a cutting mechanism, and a reactionary lubricant 100. Next, the material stock is placed on to the work surface of the mechanical machining device 102, and the mechanical machining device is initiated 104. Next, the cutting mechanism in the mechanical machining device shapes the firearm components 106. A reactionary lubricant is added to the spinning cutting device that is engaging in shaping the firearm component and the firearm component's surface 108. An In Situ formation process is then run to shape out a firearm component 110. Finally, the friction of the spinning cutting device and reactionary lubricant create at least one layer of graphene on the firearm component and reduces asperities in the material stock 112.

Figure 2:
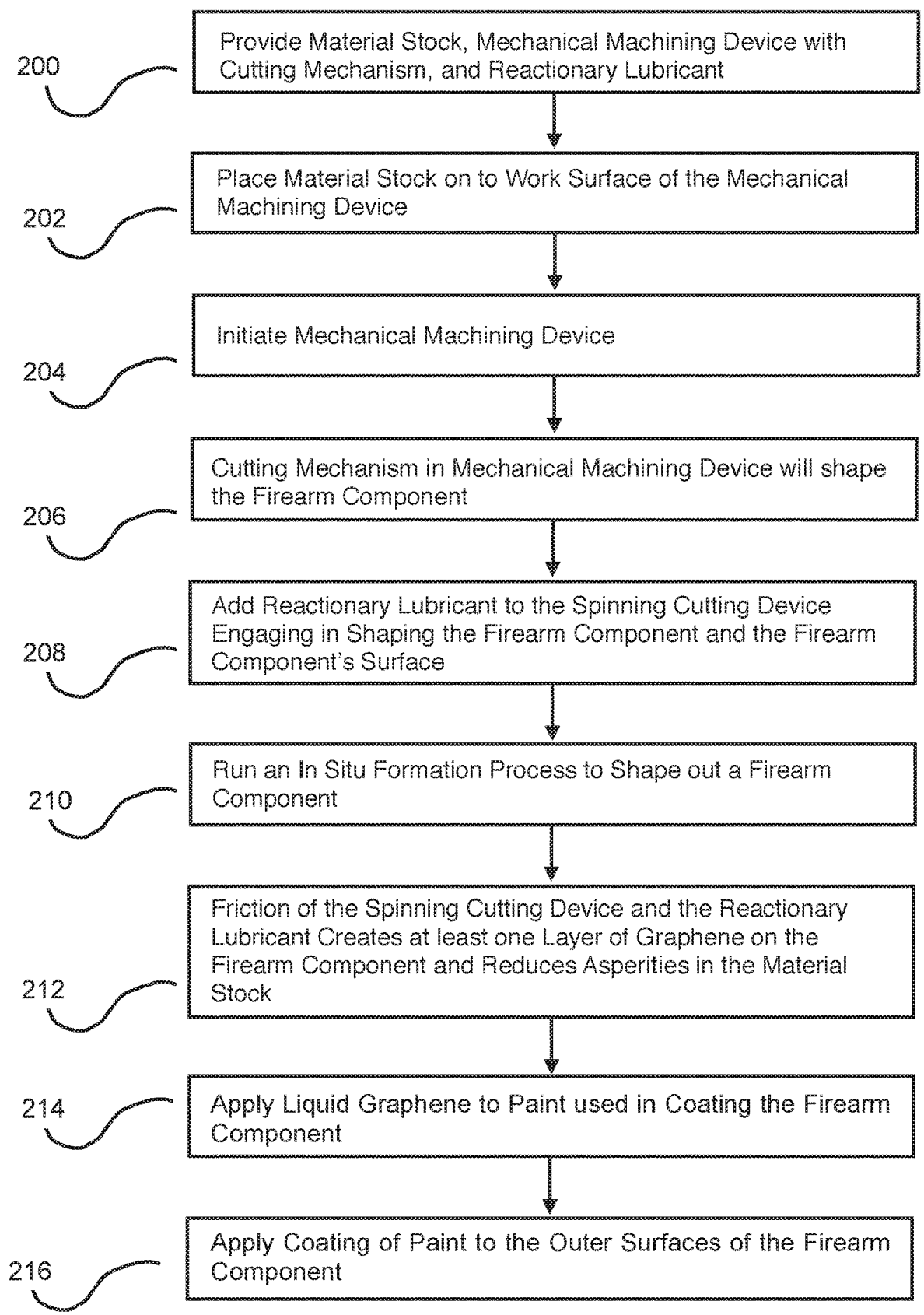
FIG. 2: A flowchart demonstrating the preferred embodiment of the present invention with the addition of a step for applying a coating of paint.

Shown in FIG. 2 is a flow diagram of the preferred embodiment of the system, similar to that shown in FIG. 1, wherein the system involves providing material stock, a mechanical machining device with a cutting mechanism, and a reactionary lubricant 200. Next, the material stock is placed on to the work surface of the mechanical machining device 202, and the mechanical machining device is initiated 204. Next, the cutting mechanism in the mechanical machining device shapes the firearm components 206. A reactionary lubricant is added to the spinning cutting device that is engaging in shaping the firearm component and the firearm component's surface 208. An In Situ formation process is then run to shape out a firearm component 210. Finally, the friction of the spinning cutting device and reactionary lubricant create at least one layer of graphene on the firearm component and reduces asperities in the material stock 212. However, FIG. 2 also discloses the additional steps of adding liquid graphene to paint used in coating the firearm component 214, and applying the coating of paint to the outer surfaces of the firearm component 216.

Figure 3:
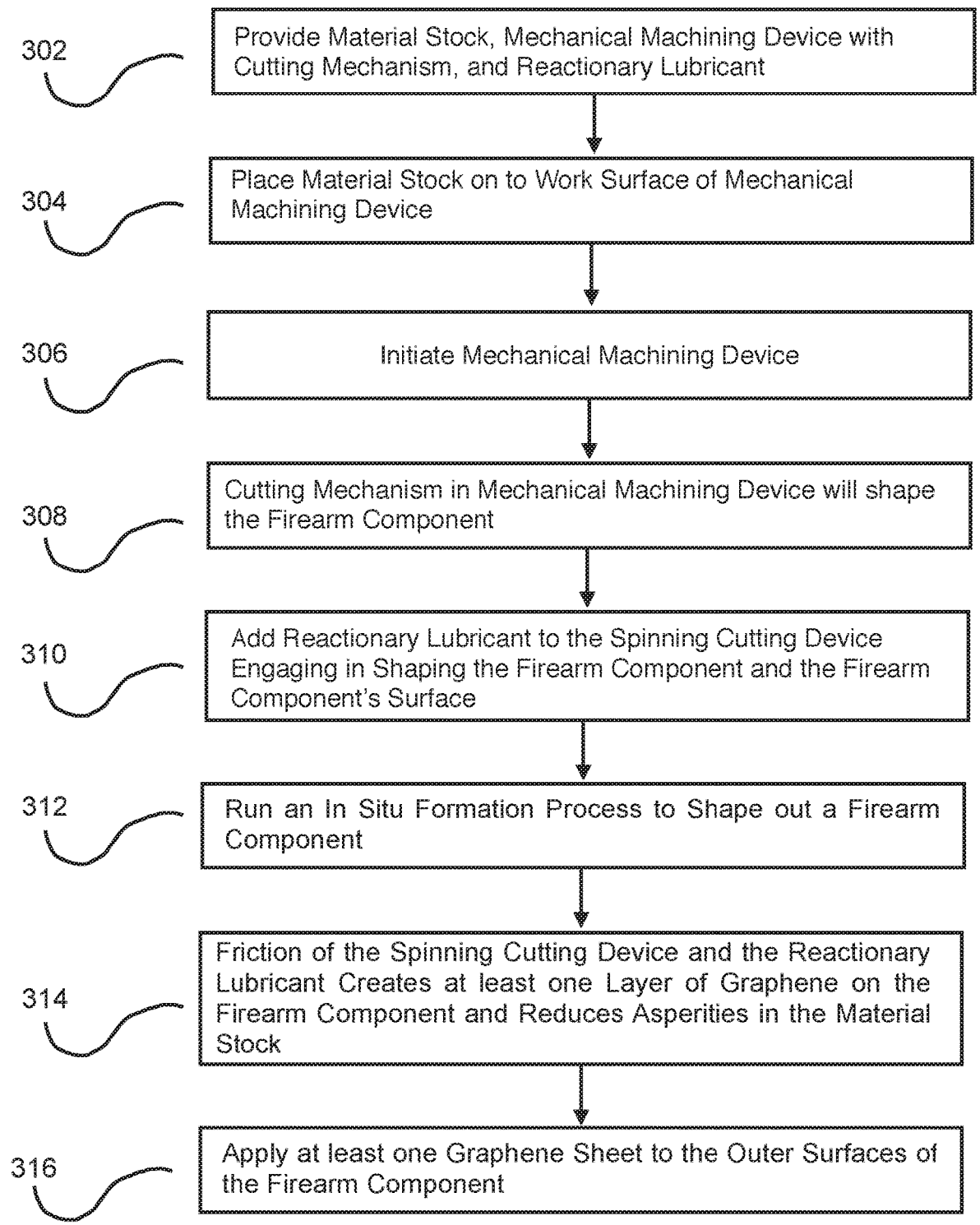
FIG. 3: A flowchart demonstrating the preferred embodiment of the present invention with the addition of a step for applying a sheet of graphene.

Shown in FIG. 2 is a flow diagram of the preferred embodiment of the system, similar to that shown in FIGS. 1 and 2, wherein the system involves providing material stock, a mechanical machining device with a cutting mechanism, and a reactionary lubricant 302. Next, the material stock is placed on to the work surface of the mechanical machining device 304, and the mechanical machining device is initiated 306. Next, the cutting mechanism in the mechanical machining device shapes the firearm components 308. A reactionary lubricant is added to the spinning cutting device that is engaging in shaping the firearm component and the firearm component's surface 310. An In Situ formation process is then run to shape out a firearm component 312. Finally, the friction of the spinning cutting device and reactionary lubricant create at least one layer of graphene on the firearm component and reduces asperities in the material stock 314. However, FIG. 3 discloses the additional steps of applying at least one graphene sheet to the outer surface of the firearm component 316.

Figure 4:
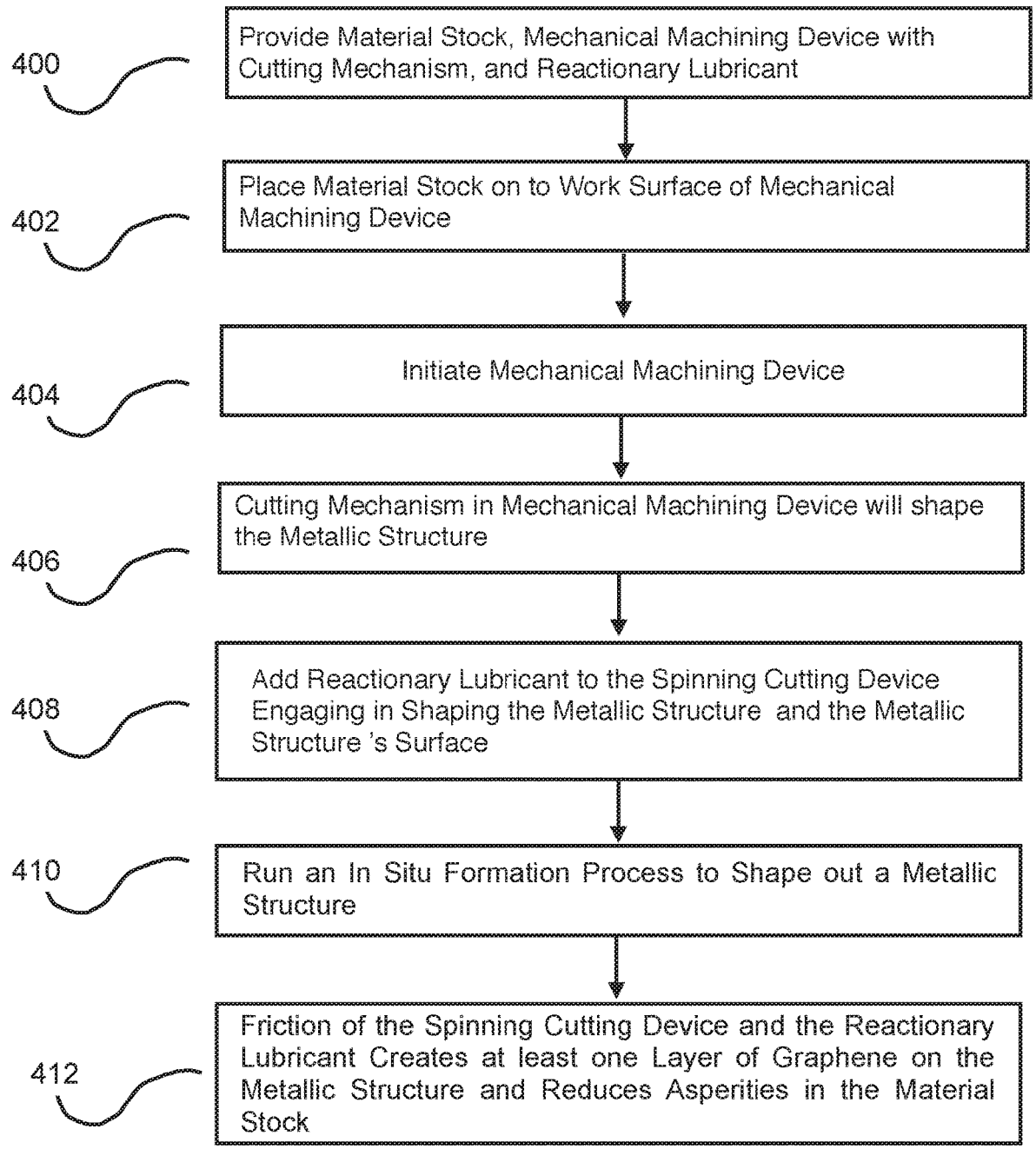
FIG. 4: A flowchart demonstrating a further embodiment of the present invention.

Shown in FIG. 4 is a flow diagram of an additional embodiment of the system. The system involves providing material stock, a mechanical machining device with a cutting mechanism, and a reactionary lubricant 400. Next, the material stock is placed on to the work surface of the mechanical machining device 402, and the mechanical machining device is initiated 404. Next, the cutting mechanism in the mechanical machining device shapes the metallic structure 406. A reactionary lubricant is added to the spinning cutting device that is engaging in shaping the metallic structure and the metallic structure's surface 408. An In Situ formation process is then run to shape out a metallic structure 410. Finally, the friction of the spinning cutting device and reactionary lubricant create at least one layer of graphene on the metallic structure and reduces asperities in the material stock 412.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

I claim:

1. A method for applying a graphene layer to metallic firearm elements, the method comprising:
   providing:
   i. at least one element of material stock,
   ii. at least one mechanical machining device with at least one cutting mechanism,
   iii. a reactionary lubricant,
   placing the material stock on to a work surface of the machining device;
   initiating the mechanical machining device, wherein the cutting mechanism spins and shapes a firearm component;
   adding reactionary lubricant to the spinning cutting device engaged in shaping the firearm component and to the firearm component's surface; and
   running an in situ formation process to shape out the firearm component, wherein the friction of the spinning cutting device and the reactionary lubricant creates at least one layer of graphene on at least the firearm component and reducs asperities in the material stock.

2. The method recited in claim 1, wherein the firearm component is a barrel of a firearm having a layer of graphene applied to the inner bore thereof.

3. The method recited in claim 2, further comprising:
   applying at least one layer of graphene to an outer surface of the barrel.

4. The method recited in claim 3, further comprising:
   applying a paint comprising liquid graphene to the outer surface of the barrel resulting in at least one layer of graphene on the outer surface of the barrel.

5. The method recited in claim 3, further comprising:
   applying a graphene sheet to the outer surface of the barrel resulting in at least one layer of graphene on the outer surface of the barrel.

6. The method recited in claim 1, wherein the element of material stock is a metallic material.

7. The method as recited in claim 1, wherein the process creates a layer of graphene on the cutting device.

8. The method as recited in claim 1, further comprising:
   applying a paint comprising liquid graphene to the outer surface of the firearm component, resulting in at least one layer of graphene on the outer surface of the firearm component.

9. The method as recited in claim 1, wherein the at least one mechanical machining device with at least one cutting mechanism, further comprises at least one machining device selected from the group consisting of:
   i) a hand drill;
   ii) a computer numerical control milling machine;
   iii) a manual milling machine; and
   iv) a lathe machine.

10. The method as recited in claim 1, wherein the at least one cutting device is a drill bit.

11. The method as recited in claim 1, wherein the at least one cutting device is a blade.

12. A method for applying a graphene layer to metallic structure, the method comprising:
   providing:
   i. at least one element of material stock,
   ii. at least one mechanical machining device with at least one drill bit, and
   iii. a reactionary lubricant;
   placing the material stock on to a work surface of the machining device;
   initiating the mechanical machining device, wherein the drill bit spins and shapes the metallic structure;
   adding reactionary lubricant to the spinning drill bit engaged in shaping the metallic structure; and
   running an in situ formation process to shape out the metallic structure, wherein the friction of the spinning drill bit and the reactionary lubricant creates at least one layer of graphene on the metallic structure and reduces asperityies in the metallic structure.

13. The method recited in claim 12, further comprising:
   applying at least one layer of graphene to an outer surface of the metallic structure.

14. The method recited in claim 13, further comprising:
   applying a paint comprising liquid graphene to the metallic structure, resulting in at least one layer of graphene on the outer surface of the metallic structure.

15. The method recited in claim 13, further comprising:
applying a graphene sheet to the outer surface of the metallic structure, resulting in at least one layer of graphene on the outer surface of the metallic structure.

16. The method recited in claim 12, wherein the element of material stock is a metallic material.

17. The method as recited in claim 12, wherein the process creates a layer of graphene on the drill bit.

18. The method as recited in claim 12, wherein the at least one mechanical machining device with at least one drill bit, further comprises at least one machining device selected from the group consisting of:
   i) a hand drill;
   ii) a computer numerical control milling machine;
   iii) a manual milling machine; and
   iv) a lathe machine.

* * * * *